April 9, 1963     R. BACHI     3,084,456
MEANS FOR EXPRESSING AND IMPARTING INTELLIGENCE
Filed Oct. 19, 1960     9 Sheets-Sheet 1 a   b   c

Inventor
ROBERTO BACHI

By
Albert J. Kramer
Attorney

April 9, 1963  R. BACHI  3,084,456
MEANS FOR EXPRESSING AND IMPARTING INTELLIGENCE
Filed Oct. 19, 1960  9 Sheets-Sheet 2

Inventor
ROBERTO BACHI
By
Albert J. Kramer
Attorney

April 9, 1963  R. BACHI  3,084,456
MEANS FOR EXPRESSING AND IMPARTING INTELLIGENCE
Filed Oct. 19, 1960  9 Sheets-Sheet 3

Inventor
ROBERTO BACHI

April 9, 1963    R. BACHI    3,084,456
MEANS FOR EXPRESSING AND IMPARTING INTELLIGENCE
Filed Oct. 19, 1960    9 Sheets-Sheet 4

Inventor
ROBERTO BACHI

By Albert J. Kramer
Attorney

April 9, 1963 R. BACHI 3,084,456
MEANS FOR EXPRESSING AND IMPARTING INTELLIGENCE
Filed Oct. 19, 1960 9 Sheets-Sheet 5

Inventor
ROBERTO BACHI

By
Albert J. Kramer
Attorney

Fig. 21.

April 9, 1963 R. BACHI 3,084,456
MEANS FOR EXPRESSING AND IMPARTING INTELLIGENCE
Filed Oct. 19, 1960 9 Sheets-Sheet 8

Fig. 23.

Inventor
ROBERTO BACHI

By Albert J. Kramer
Attorney

April 9, 1963  R. BACHI  3,084,456
MEANS FOR EXPRESSING AND IMPARTING INTELLIGENCE
Filed Oct. 19, 1960  9 Sheets-Sheet 9

Inventor
ROBERTO BACHI
By Albert J. Kramer
Attorney

United States Patent Office 3,084,456
Patented Apr. 9, 1963

3,084,456
MEANS FOR EXPRESSING AND IMPARTING INTELLIGENCE
Roberto Bachi, 19 Hovevej Zion St., Jerusalem, Israel
Filed Oct. 19, 1960, Ser. No. 63,579
4 Claims. (Cl. 35—54)

The present invention relates to a means for expressing in a visual manner and for communicating and transmitting intelligence which can be related to or represented in values of size, quantity or the like. The new means will serve therefore for the preparation of graphical or schematical representations, of diagrams and maps, such as commonly employed for visually representing intelligence of the kind referred to above.

According to the invention the new means comprises a strip or sheet—which may be of any desired circumferential outline—of material which is adapted to be imprinted with printing ink, the said strip or sheet being subdivided at least on one face thereof into a number of fields representing units of size or multiples thereof, each field being an indication of value, the value being expressed by the cumulative area covered by printing ink in that individual field.

The printing ink may be black or coloured, the material of the strips may be white or coloured.

In a special, preferred embodiment of the invention the cumulative area covered by printing ink is the sum (i) of a number of equal dots or small areas or multiples of such dots, grouped in such a way as to render easy the perception of the area covered and (ii) of a multiple of totally covered fields, also easily distinguishable.

According to a further feature of the invention the said so subdivided and imprinted strip or sheet comprises an additional blank portion, preferably of the same size or shape as the whole imprinted portion, for a purpose to be described.

According to an alternative embodiment of the invention the fields of the strip or sheet are occupied by repeated groups of dots or small areas, grouped in such a way as to render easy the counting of dots or areas included in each group.

According to yet another feature of the invention the said strip or sheet carries on the reverse or in a marginal portion of its frontside a scale, graduation or indications of measure, so as to facilitate the cutting off from the sheet or strip of portions of easily predetermined size.

According to yet another feature of the invention, the fields described above, containing groups of dots or small areas or multiples thereof may be repeated a large number of times on pre-printed sheets and may be cut in any form desired.

According to yet another feature of the invention the said strips or sheets are provided on their backs with an adhesive for facilitating their being affixed to an underlying sheet.

Finally, the invention relates to a kit comprising both the strips or sheets referred to, as well as carrier sheets which latter are subdivided into fields corresponding in size to the fields into which the first-named strips or sheets are divided, a grid being thus formed on the said carrier sheets.

The invention will now be described with reference to four embodiments, as follows:

An embodiment A is shown in the annexed drawings in FIGS. 1–11 wherein FIGS. 1 to 6 represent examples of strips according to the invention, while FIG. 11 shows a graph of the distribution of a population by age prepared with the strips and carrier sheets according to the invention. Turning first to FIG. 1, the strip shown there comprises a portion $a$ which is fully covered with printing ink. The portion $b$ adjacent to the portion $a$ is a square on which appears one small square dot which occupies $1/20$ of the area of $b$. Adjacent to the field $b$ extends a blank portion $c$. The length of portions $a$ and $c$ may be any multiple of $b$ as desired, their width however, is equivalent to a side of the square $b$.

Figure 1:
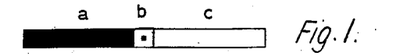
Figure 2:
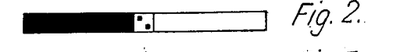
Figure 3:
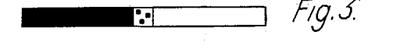
Figure 4:
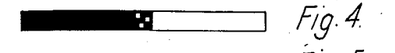

The strip shown in FIG. 2 is identical with the one shown in FIG. 1, except that the square $b$ bears two dots, equivalent to $2/20$ of the area of the square $b$. In FIG. 3 the square $b$ bears three dots, equivalent to $3/20$ of the area of square $b$. In FIG. 4 a strip is shown where the whole of square $b$ is covered with printing ink and only 3 small squares, equivalent together to $3/20$ of the area are left blank. Thus the covered area of $b$ is $17/20$.

Figures 5, 6:
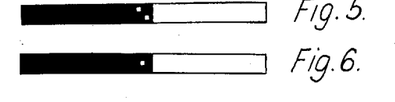

In the same way the area of the square $b$ in FIG. 5 which is covered by printing ink is $18/20$ since $2/20$ are left blank. The area of the field $b$ in FIG. 6 which is covered by ink is $19/20$.

Figure 9:
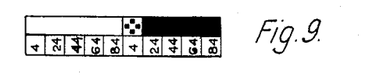
FIG. 9 shows a strip of the type represented in FIGS. 1 to 6 with a graduation and FIG. 10 shows five indications of value obtained by cutting in the proper way the strip of FIG. 9.
Figure 10:
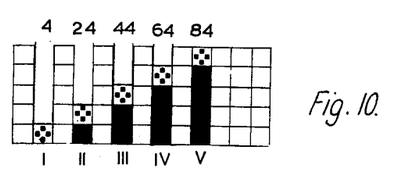

Since the width of the area $a$ is the same as that of area $b$, a part from the strip can be detached in such a way that the portion remaining with area $b$ is a multiple of the latter, equally the blank portion $c$ can be cut to such a length that it represents a complement or function of portions $a$ and $b$ together. The cutting down of the strip to a desired length will be facilitated by the graduation shown in FIG. 9. This graduation may be printed either on the longitudinal edge of the strip or on its back. FIG. 9 shows, as an example, a strip bearing 4 dots on field $b$. By cutting twice-across the strip, at the two places where the number 4 is indicated, a proper representation of number 4 is obtained (as shown in FIG. 10, I). In this representation square $b$ bears 4 dots, whilst the remaining part of the graph is left blank. Alternatively, by cutting across at the two places where the number 24 is indicated, a proper representation of 24 is obtained (as shown by FIG. 10, II). Here the total area covered by ink consists of 4 small dots of unit area—plus a square of area 20 times larger than that of each dot. So the total area covered by ink is a fully covered square equal to the value 20, plus the four dots—equal to 4, or in other words the area covered is $24/100$ of the total area of the graph. In a similar way, by cutting across the two places where the number 44 is indicated a proper representation of 44 is obtained, as shown by FIG. 10, III, where $44/100$ of the total area of the graph is covered by ink. FIGS. 10, IV and 10, V show in a similar way how 64 and 84 may be represented by cutting in the proper places across strip 9.

Figure 7:
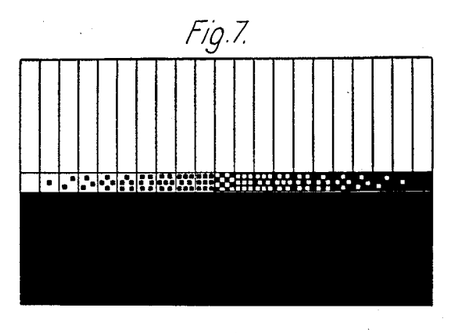
FIG. 7 is a sheet imprinted according to the invention.

In a similar way, strip 1 may be utilized for representing the numbers 1, 21, 41, 61 and 81; strip 2 may be utilized for representing the numbers 2, 22, 42, 62 and 82; and so on; and by properly utilizing the 21 strips shown in FIG. 7, all figures from 0 to 100 may be represented.

Figure 8:
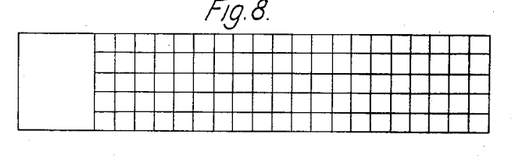
FIG. 8 is a carrier sheet on which a grid is imposed, subdivided into fields according to the fields of the strips and sheets shown in FIGS. 1 to 7.
Figures 11, 12:
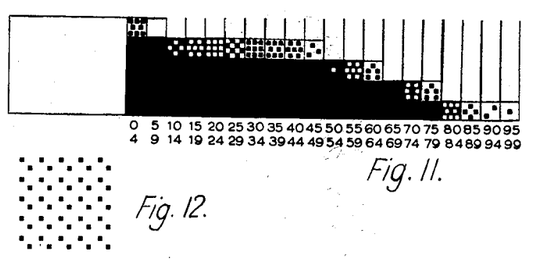

FIG. 11 shows an example of a statistical graph obtained by pasting strips of the kind shown in FIG. 7 onto a carrier sheet of the type of the grid of FIG. 8. The data represented in FIG. 11 indicate how many persons per 1000 in a population are aged 0–4, 5–9 . . . 95–99. In correspondence to each age group a strip is given, in which the quantity of ink is proportional to data to be represented. Thus the strip corresponding to ages 0–4 indicates that 88 per 1,000 are at those ages, that corresponding to ages 5–9 indicates that 80 per 1,000 are at those ages . . . that corresponding to ages 95–99 indicates that 1 per 1,000 are at those ages.

Figure 13:
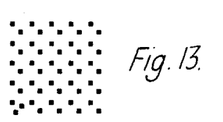
Figure 14:
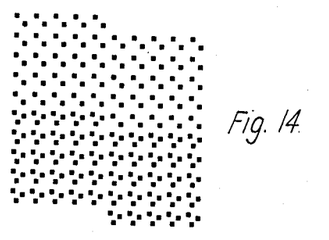
Figure 15:
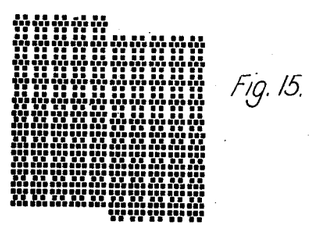
Figure 16:
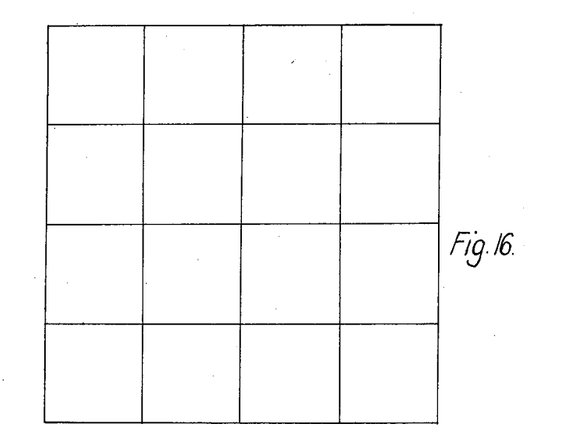

An embodiment B of the invention is illustrated by the annexed drawings FIGS. 12–17. FIG. 12 shows a square sheet covered by 25 groups of dots each of which includes two dots; in this square there are thus 50 dots covering $^{50}/_{500}$ of the entire area, the value expressed thereby thus being 50 or a multiple thereof. FIG. 13 shows a square sheet covered by 25 groups of dots of which 24 are of two dots each whilst one is of 3 dots. In this square there are thus 51 dots covering $^{51}/_{500}$ of the entire area. By increasing or decreasing the number of dots included in each group all numbers between 0 and 500 may be represented by this embodiment. Sheets may be produced like those shown in FIGS. 14 and 15 from which 25 alternative values may be obtained by properly changing the ways of cutting. The example shown in FIG. 14 includes groups of 2 and 3 dots from which the square fields with 50 and 51 dots shown in FIGS. 12 and 13 were obtained and for which further square fields with 52, 53 . . . up to 75 dots may be obtained. The example shown in FIG. 15 includes groups of 7 and 8 dots from which square fields including from 175 to 200 dots may be obtained. FIG. 16 shows a carrier in the form of a ruled grid on which squares of the type of those of FIGS. 12–15 may be pasted.

Figure 17:
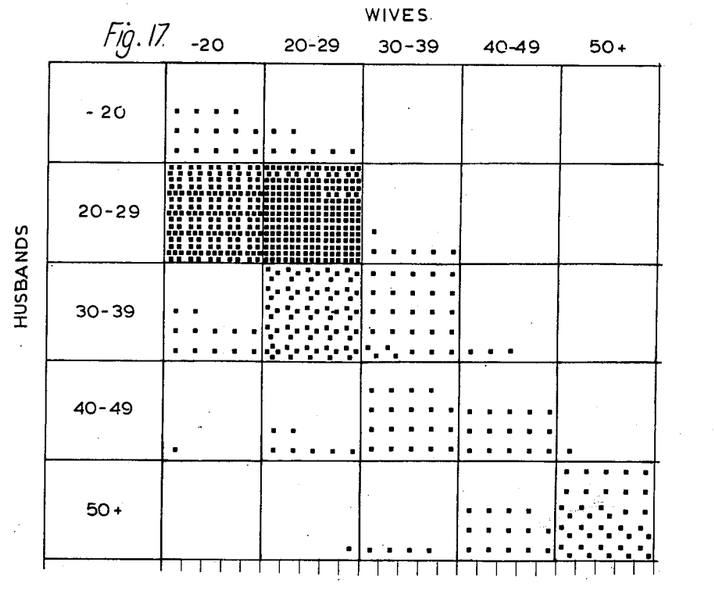

FIG. 17 shows an example of a statistical graph obtained by pasting squares of the kind shown in FIGS. 12–15 over a grid of the kind of FIG. 16. The data represented in FIG. 17 show the distribution of marriages according to ages of husbands and ages of wives in a small town. It is seen for instance that 14 marriages have been contracted between husbands and wives aged less than 20, 218 between husbands and wives aged 20–29 etc. each figure is represented in the proper square by a number of dots being a quantity of ink, proportional to the figure which it is desired to convey. Also for embodiment B, a proper scale may be printed on the back of sheets like those indicated in FIG. 9 in order to facilitate the cutting in the proper way.

Figure 18:
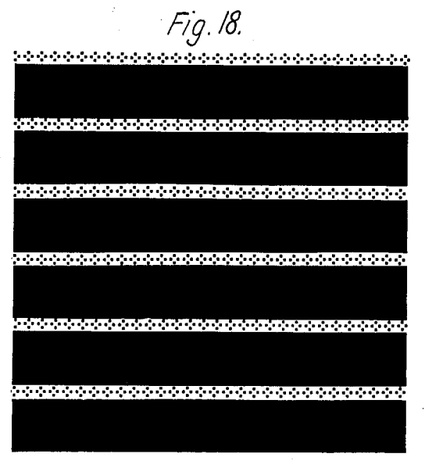

The embodiment C of the invention is obtained by preparing sheets in which patterns like those of embodiment A are repeated a large number of times. For instance, FIG. 18 shows a sheet in which the value 84, as represented by FIG. 10, V is repeated a large number of times.

Figure 19:
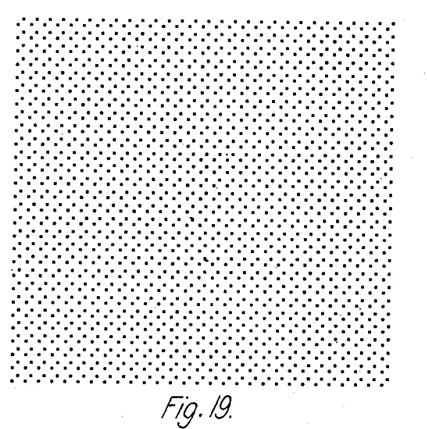
Figure 20:
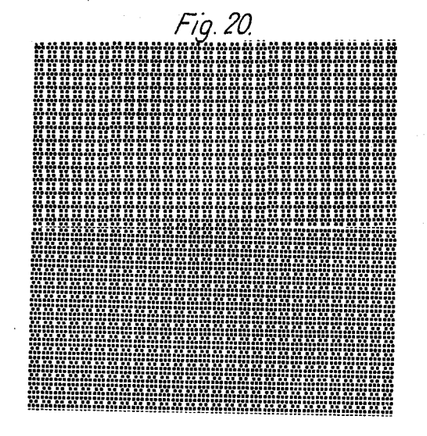

In a similar way, embodiment D is obtained by repeating a large number of times patterns like those of embodiment B. For instance, FIG. 19 shows a large number of times groups with two dots each (as shown by the pattern of FIG. 12) and FIG. 20 shows a large number of times groups of 7 and 8 dots (as shown by one of the patterns included in FIG. 14).

Figure 21:
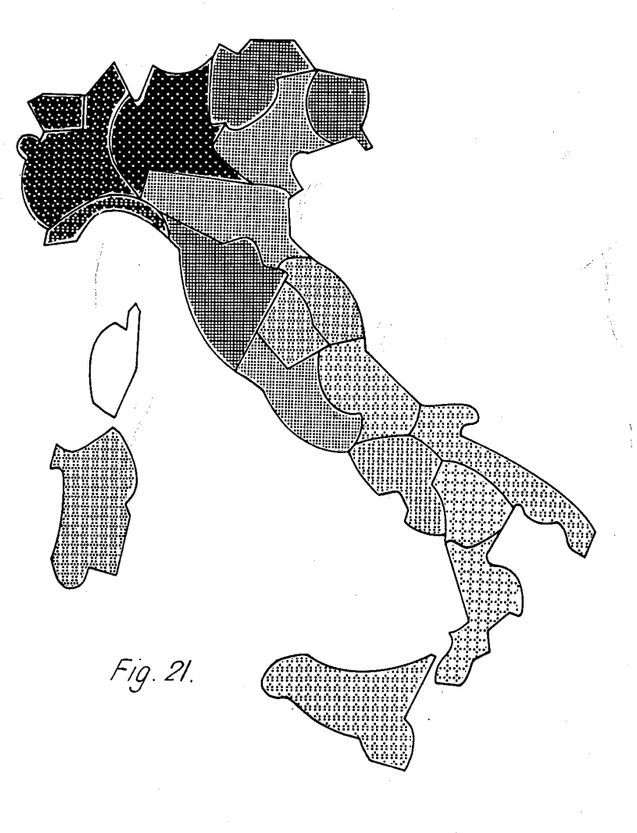
Figure 22:
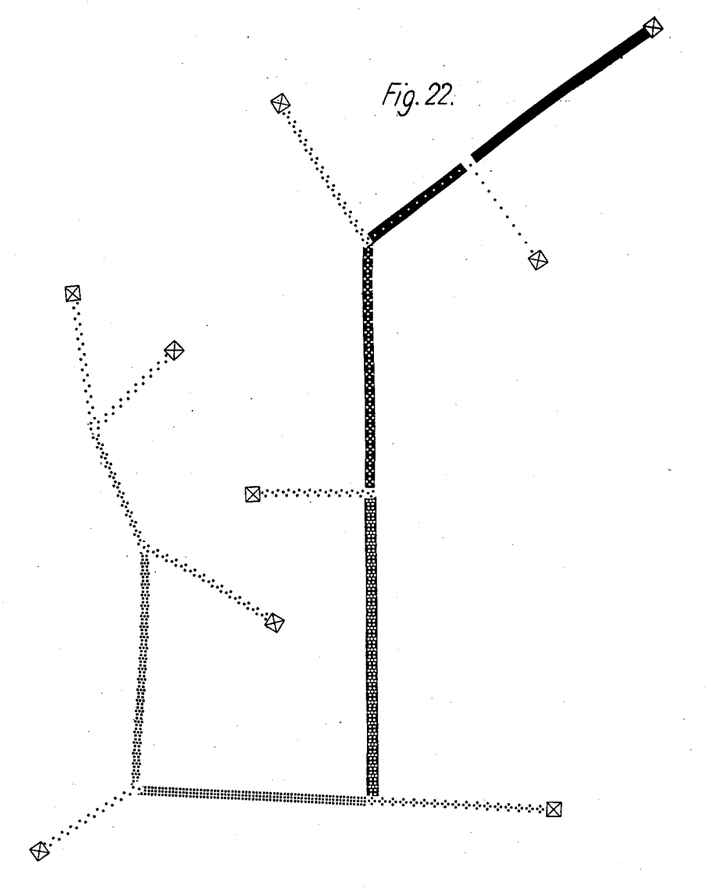

Sheets prepared according to any of embodiments C and D may be cut in any form, in circles, in bars, in the form of geographical areas, of roads, etc. Those cut patterns may be pasted or made to adhere in any other way on carriers having the form of circles, or sections thereof, of bars or sections thereof, etc. This permits the representation on those circles bars, geographical areas, roads, images, etc. of pertinent statistical data by means of patterns which are easily distinguishable and which the proportion of ink covered areas may be made to denote data with any desired degree of exactitude. Examples of this method are shown by FIGS. 21 and 22. FIG. 21 shows the percentage of population engaged in industry, commerce and services in each region of Italy. Percentages are indicated here by patterns of corresponding proportion of black over white. FIG. 22 shows the traffic on a road by patterns in which quantity of ink is proportional to size of traffic enumerated in each section of the road. In FIGS. 21 and 22, for the sake of simplicity, patterns were used in which each group of dots may include from 0 to 10 black dots on white field or from 0 to 10 white dots on black field, thus forming a series of 21 easily distinguishable patterns in which the percentage of the covered area of a field increases regularly from 0% to 5%, 10% and so on up to 100% by intervals of 5%. However if more refined scales are needed, by using patterns of the type illustrated by FIG. 18, a scale of 100 patterns easily distinguishable with regular 1% intervals may be formed; by use of patterns like those shown in FIGS. 12 to 15 and 20 in which groups with different numbers of dots are combined together, most exact scales with a much higher number of patterns may be obtained.

Graphs according to FIGS. 21 and 22 are easily prepared by having a carrier with the form of the geographical areas, sections of the road, etc. printed on it (as shown for instance by FIG. 23), by cutting in the proper form the sheets of embodiments like C and D, and by making the patterns cut in this way adhere on the carrier. Embodiments A, B, C and D described above are only examples of the method: size, number and form of dots included in the sheet may be changed as convenient. Moreover, different colours may be used both for the ink with which patterns are printed and for the field on which they are printed. This may add further qualitative intelligence to that given by the patterns themselves.

Figure 23:
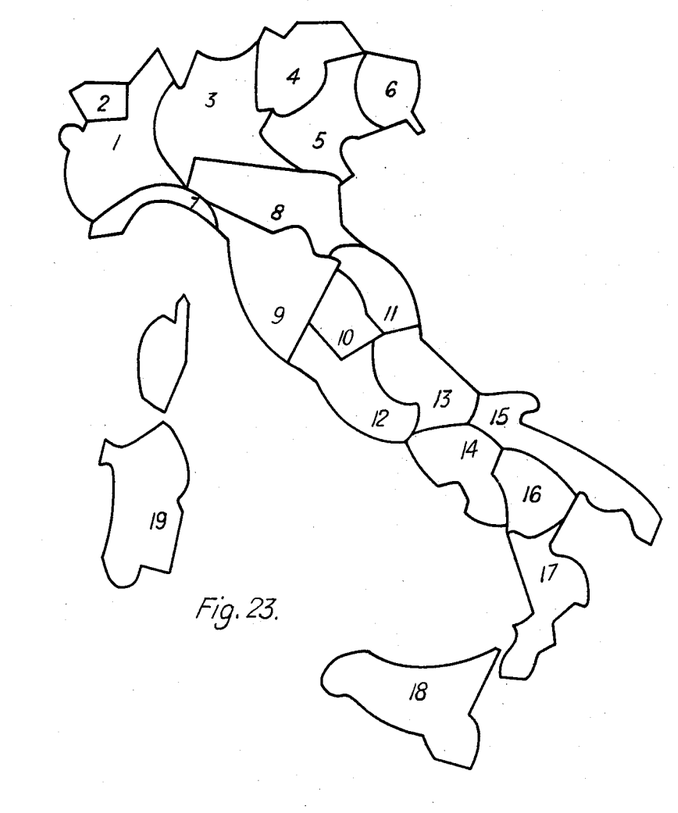
Figure 24:
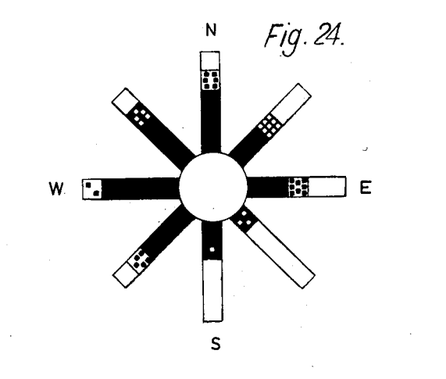
Figure 25:
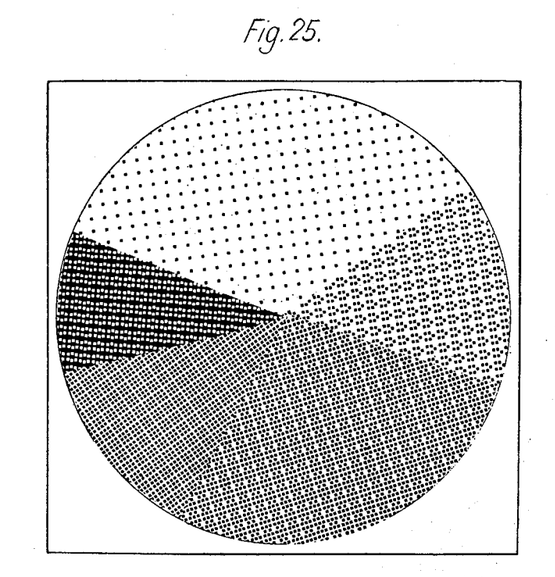
Figure 26:
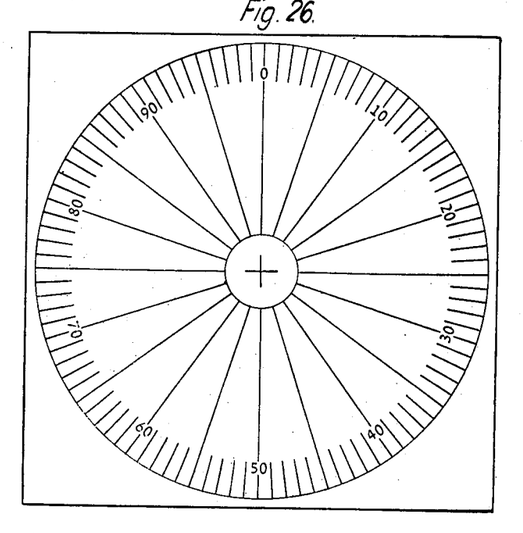

Besides this, the carriers may be printed in many forms as illustrated by FIGS. 8, 16 and 23. As a further illustration of the possibility of preparing carriers on different forms, FIGS. 24, 25 and 26 are given. FIG. 24 shows the distribution of winds according to their direction. This figure is obtained by pasting strips of the type of FIGS. 1–7 on a proper carrier showing wind directions. In the example given the quantity of ink given on each strip is proportional to the number of observations showing the direction of wind indicated.

FIG. 26 shows a carrier sheet for the preparation of a circular graph or "pie diagram." On the sheet is superposed a circle divided into 100 sectors of equal size. A similar circle subdivided into percentages is printed on the reverse of sheets according to the embodiment C and D or of any other papers conveying or expressing any type of intelligence. By properly cutting these sheets into pieces the size of which is equivalent to the percentages desired and pasting these pieces on to the carrier, a circular diagram like that of FIG. 25 is obtained. This diagram shows the percentage of sales by a firm, selling a product in packages of respectively one, five, eight, nine and fourteen pieces in a package. The number of pieces per package is shown by the amount of dots in each group of dots, printed in the pattern; percentage of sales of each type of packages is shown by the area of the corresponding sector in the diagram.

I claim:

1. The method of preparing a graph comprising selecting strips from a series of strips, each of said strips being sub-divided into two distinctive fields, trimming each selected strip differentially at least at one of its ends to determine the magnitude of each field, the overall lengths of the trimmed strips being uniform, assembling the trimmed strips and affixing them to a backing sheet in a geometrical relation so as to present the data represented by the combined fields of the assembled strips complemental to one another.

2. The method as defined by claim 1 in which the strips are assembled in parallel relation.

3. The method as defined by claim 1 in which the strips are assembled in radial relation relative to each other.

4. A graph comprising a group of selected strips attached to a backing sheet, each of said strips being subdivided into two distinctive fields and trimmed at least at one of its ends to determine the magnitude of each field, the overall lengths of said strips being uniform, said strips being secured to the backing sheet in a geometrical pattern so as to present the data represented by the combined fields of the strips complemental to one another, the fields of each strip comprising two rectangular portions on opposite sides of a square portion, the area of each rectangular portion being a whole multiple of the area of the square, said square having delineated thereon a group of separated marks, the ratio of the total area of said group of marks to the total area of the square being substantially proportional to the number of marks of the group.

References Cited in the file of this patent

UNITED STATES PATENTS 2,924,895     Bachi _________________ Feb. 16, 1960